United States Patent [19]

Yoshioka et al.

[11] Patent Number: 5,351,154
[45] Date of Patent: Sep. 27, 1994

[54] MAGNETIC RECORDING AND REPRODUCING APPARATUS

[75] Inventors: Atsushi Yoshioka, Ebina; Iwao Aizawa, Yokohama, both of Japan

[73] Assignee: Hitachi, Ltd., Tokyo, Japan

[21] Appl. No.: 645,395

[22] Filed: Jan. 24, 1991

[30] Foreign Application Priority Data

Jan. 24, 1990 [JP] Japan .................................. 2-12548

[51] Int. Cl.$^5$ .............................................. H04N 5/78
[52] U.S. Cl. .................................. 360/35.1; 360/10.3; 360/19.1; 358/343
[58] Field of Search ...................... 360/19.1, 35.1, 9.1, 360/10.1, 10.3, 27, 31, 32, 71, 72.1, 74.1, 74.4; 358/343, 909

[56] References Cited

U.S. PATENT DOCUMENTS

| 4,604,668 | 8/1986 | Lemelson | 360/10.1 |
| 4,858,032 | 8/1989 | Okada et al. | 360/9.1 |

FOREIGN PATENT DOCUMENTS

| 0316770 | 5/1989 | European Pat. Off. |
| 3042274 | 5/1982 | Fed. Rep. of Germany |
| 3310998 | 9/1983 | Fed. Rep. of Germany |
| 0164383 | 9/1983 | Japan |
| 0033367 | 2/1987 | Japan |
| 0040105 | 2/1990 | Japan |

*Primary Examiner*—Andrew L. Sniezek
*Attorney, Agent, or Firm*—Antonelli, Terry, Stout & Kraus

[57] ABSTRACT

A magnetic recording and reproducing apparatus wherein a moving picture signal and an audio signal following the moving picture are recorded and reproduced on a first area in a recording track inclined with respect to a traveling direction of a magnetic tape and digital data indicating a one-cut frame or a field) still picture signal is recorded and reproduced on a second area in the recording track. The apparatus includes a circuit for detecting that digital data indicating the still picture is reproduced by an amount of data corresponding to the one-cut still picture, a switch which is operated by a person who monitors pictures and used to instruct restart of the magnetic tape, and a logic circuit. The logic circuit generates an instruction for switching the reproduced signal output from the moving picture to the still picture on the basis of the output of the detection circuit, and instruction for rewinding the magnetic tape to a position near the recording start position of the digital data indicating the still picture and for stopping the magnetic tape thereat, and instruction for switching the reproducing signal output from the still picture to the moving picture signal when the switch is operated, and an instruction for causing the magnetic tape to travel once again at the normal traveling speed for reproducing a moving picture signal.

10 Claims, 6 Drawing Sheets

MAGNETIC RECORDING AND REPRODUCING APPARATUS

BACKGROUND OF THE INVENTION

The present invention relates to a magnetic recording and reproducing apparatus, for example, a video tape recorder (hereinafter abbreviated to VTR), which can record both continuous moving pictures and a still picture for each frame or field.

In a VTR which is called 8 mm-Video, a recording track on a magnetic tape has a general moving picture analog recording area by two-head helical scan and also an overlap recording area (commonly called) on the extension thereof. The overlap recording area can be formed by winding the magnetic tape round the rotary head drum in an about 220° arc and is generally used to record PCM audio signals.

A proposal that a still picture in each frame (or field) is to be recorded digitally on the overlap recording area has been made. Such a proposal is indicated, for example, in Japanese Patent Application Laid-Open No. 62-33367.

For that purpose, a VTR combined with video camera is provided with a digital-electronic still camera function in addition to a general moving picture analog recording function.

Compared with a case that generally recorded moving pictures are reproduced as still pictures by the still operation, the picture quality is hardly degraded in the recording and reproducing process due to digital recording. By simultaneously reading signals from the two lines vertically neighboring the image sensor of the camera, the vertical resolution is not degraded and a blurred picture due to movement of a subject can be eliminated. By doing this, still pictures of good quality can be obtained. As video printers have come into wide use, it is not required for users to carry around both a still camera and a VTR combined with video camera (camcorder).

SUMMARY OF THE INVENTION

In the apparatus described in the above literature, still picture data for one cut is recorded on a magnetic tape at random by the push button operation of a user while moving pictures are being taken.

Since the user does not know where the still pictures are recorded on the magnetic tape, it requires a great deal of time to find the locations of the still pictures when they are to be outputted to a television set or printer paper. How to operate the apparatus to see only moving pictures, or only still pictures, or both of them on a television set is not particularly described.

An object of the present invention is to provide a magnetic recording and reproducing apparatus wherein the reproducing operations of the apparatus are improved so that convenient operations for the user are secured.

The above object is accomplished according to the present invention by providing a magnetic recording and reproducing apparatus which comprises a rotary drum, a magnetic head mounted to the rotary drum, a mechanism for traveling a magnetic tape so as to wind round the rotary drum in a more than 180° arc, a circuit for recording a moving picture signal and an audio signal for the moving picture on a first area in a recording track inclined to a magnetic tape traveling direction, a circuit for recording digital data indicating a one-cut still picture signal corresponding to a frame or a field on a second area in the recording track, a circuit for reproducing the moving picture signal a circuit for reproducing said audio signal for the moving picture, a circuit for reproducing the still picture signal, a circuit for detecting that the digital data indicating the still picture is reproduced by an amount of data corresponding to the one cut of the still picture, a switch which is operated by a person who monitors pictures so as to instruct the restart of the magnetic tape, and a logic circuit which generates an instruction for switching the reproducing signal output from the moving picture to the still picture on the basis of the output of the detection circuit and an instruction for rewinding the magnetic tape to near the recording start position of the digital data indicating the still picture and stopping the magnetic tape there, and generates an instruction for switching the reproducing signal output from the still picture to the moving picture when the switch is operated and an instruction for traveling the magnetic tape once again at the general traveling speed for reproducing the moving picture signal.

DETAILED DESCRIPTION OF EMBODIMENTS

Next, the embodiments of the present invention will be described hereunder with reference to the accompanying drawings.

Although the present invention relates to principally the reproducing operation, the recording operation which is performed first will be described hereunder with reference to FIGS. 2 to 4.

Figure 2:
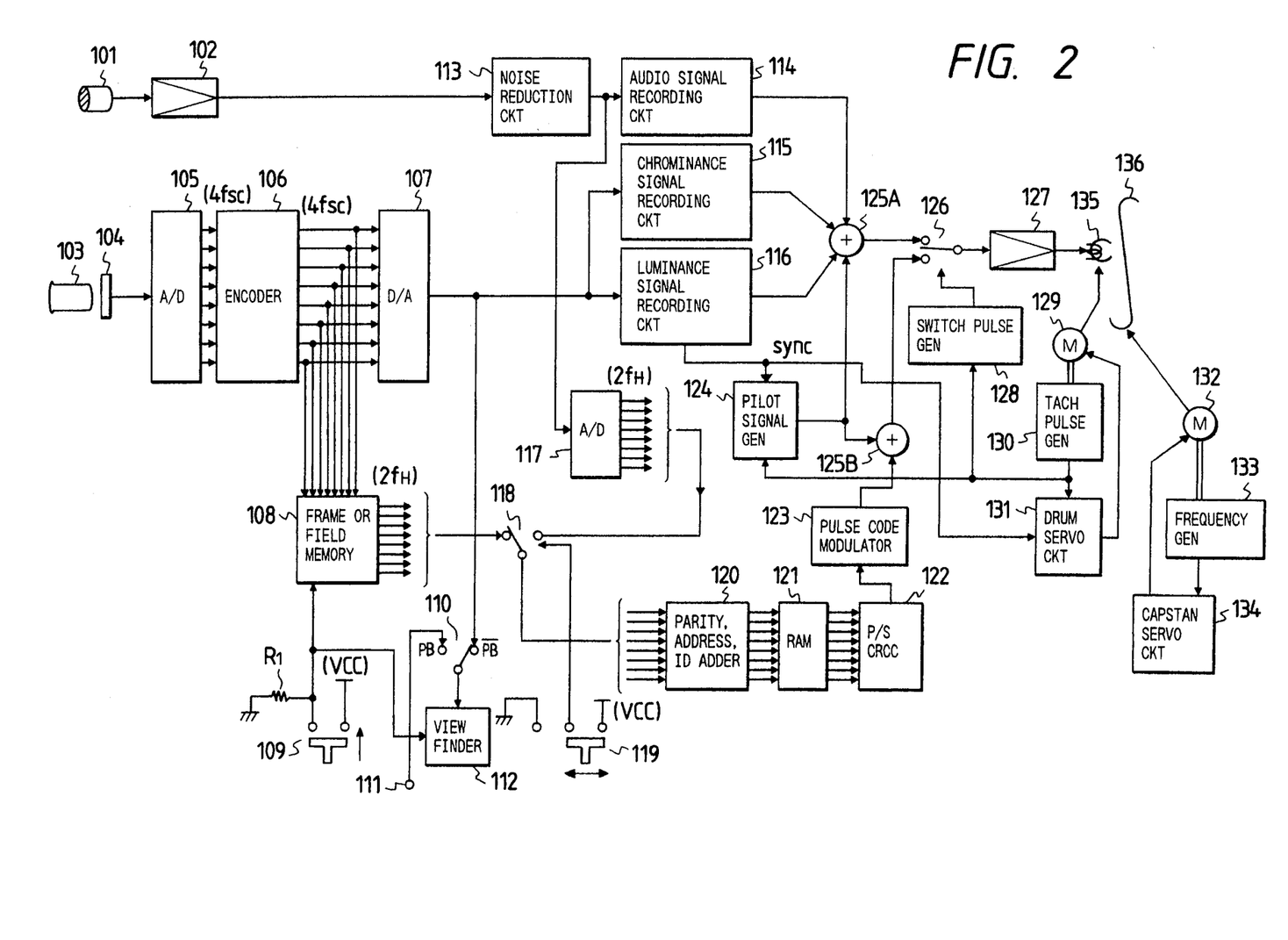
FIG. 2 is a block diagram showing an example of a recording system of a magnetic recording and reproducing apparatus of the present invention.

FIG. 2 is a block diagram showing a recording circuit of a VTR combined with video camera which is used in the present invention.

The above VTR conforms to the 8 mm video standard.

First, the camera unit will be described. In this example, processing such as generation of luminance and color-difference signals and color encoding is performed digitally as described hereunder. However, this is an example. Such processing may be performed analogically.

Light passing through a lens tube 103 forms an optical image on a solid-state image sensor 104. As is generally known, the light receiving surface of the image sensor has photodiodes corresponding to the number of scanning lines (the NTSC specifies 525 scanning lines), which are lined up in the vertical direction, and photodiodes corresponding to the number of pixels per line, which are lined up in the horizontal direction. The output thereof is supplied to an A-D converter 105 to be converted to a digital image signal. In FIG. 2, an example of a signal of a sampling frequency of $4f_{sc}$ (a symbol $f_{sc}$ indicates a frequency of a color subcarrier which is $455/2 \times 4.5/286 \approx 3.579545$ MHz) and a quantization bit number of 8 is shown. The output of the A-D converter is supplied to an encoder circuit 106, and processing such as generation of luminance and color-difference signals and color subcarrier modulation with two color-difference signals is performed digitally. Then, the output is supplied to a D-A converter 107 and a frame or field memory 108.

The output of the D-A converter 107 is an analog video signal which conforms to the NTSC standard and supplied to a luminance signal recording circuit 116 and a chrominance signal recording circuit 115 of the VTR unit. The output is also supplied to a viewfinder 112 via a switch 110 to display moving pictures which are being imaged. When the VTR unit is in the stopped or recording state, the switch 110 is connected to the $\overline{PB}$ position as shown in FIG. 2. When the VTR unit is in the reproducing state, the switch is connected to the PB position (on the opposite side). In the latter case, a reproduced video signal is supplied from the VTR unit via an input terminal 111 to the view finder 112.

A logic signal generated from a one-shot switch 109 mounted on the outer surface of the apparatus is also applied to the frame (or field) memory 108. This signal specifies the moment the user records a still picture (foregoing overlap recording). Data of the first frame (or field) after the switch 109 is pressed is stored in the memory 108 as still picture information. It is required that the data is read at a frequency of $2f_H$ which is the same as the sampling frequency of an audio signal which will be described later as an example.

When still picture data is to be read by the above method, one-field imaging causes no problems. However, one-frame imaging causes problems such as blurring of a moving object due to interlace scanning. In this case, a method that signals from the photodiodes on the two lines neighboring the solid-state image sensor in the vertical direction are simultaneously read during the same horizontal scanning period so as to read a one-frame signal during the one-field period and then the one-frame signal is reconfigured as an interlaced two-field signal can be used.

It is convenient if the output of the switch 109 is supplied also to the viewfinder 112 and the moment a still picture is imaged is indicated by characters or a lamp.

An audio signal collected by a microphone 101 is amplified by a microphone amplifier 102 and supplied to a noise reduction circuit 113 of the VTR.

Next, the VTR unit will be described hereunder. The audio signal supplied to the noise reduction circuit 113 is provided with a non-linear high-frequency band emphasis characteristic and then supplied to an audio signal recording circuit 114 and an A-D converter 117. In the audio signal recording circuit 114, the audio signal is modulated to an FM audio signal with a carrier frequency of about 1.5 MHz and supplied to one end of an adder 125A. In the A-D 10 converter 117, the audio signal is converted to a digital audio signal, for example, with a sampling frequency of $2f_H$ (a symbol $f_H$ indicates a horizontal synchronizing frequency which is $4500/286 \approx 15.734$ kHz) and a quantization bit count of 8 (10 bits are provided actually and compressed to 8 bits after quantization), and supplied to one end of a switch 118.

The luminance signal component of the foregoing analog video signal outputted from the D-A converter 107 is modulated to an FM luminance signal with a carrier frequency of, for example, about 5 MHz by the luminance signal recording circuit 116, and the chrominance signal component is down converted to a subcarrier frequency of about 47.25 $f_H$ by the chrominance signal recording circuit 115, and both signals are supplied to one end of the adder 125A.

In a pilot signal generation circuit 124, a pilot signal whose frequency is switched cyclically in the order of 6.5 $f_H$, 7.5 $f_H$, 10.5 $f_H$, and 9.5 $f_H$ for each field on the basis of the synchronizing signal which is separated by the luminance signal recording circuit 116 and a tach pulse indicating the rotation phase of a rotary head drum which will be described later is generated and supplied to another end of the adder 125A. This is a tracking control signal for 10 reproduction.

The above four signals which are frequency-division multiplexed by the adder 125A are supplied to one end of a switch 126.

The switch 118 is switched according to the position of a bistable switch 119 which can be externally switched. The switch 119 is used by the user to select recording PCM audio signals in the foregoing overlap recording area or recording still pictures digitally. When the apparatus is designed to overlap-record only still pictures, the A-D converter 117 and the switches 118 and 119 are removed, and the output of the memory 108 is directly connected to a data addition circuit 120.

In the data addition circuit 120, data address information, an identification code (a code for identifying voice or a still picture, etc.), and a parity code for error correction during reproduction are added to the output, and then the output is stored in a buffer memory 121. When the output is to be read, the time axis is compressed so that the output becomes an intermittent signal which can be recorded in the overlap area. Thereafter, in a parallel-to-serial conversion circuit 122, the 8-bit parallel data is converted to serial data, added with a CRC code for detecting an error during reproduction, and changed to a channel code which is called a biphase mark in a pulse code modulation circuit 123. The channel code is added with a pilot signal by an adder 125B and supplied to another end of the switch 126.

The output of the switch 126 is recorded on a magnetic tape 136 by a recording head 135 (two heads are provided actually) via a recording amplifier 127. As is generally known, the recording head 135 is mounted on a rotary drum (not shown in the figure). The rotary drum is rotated by a drum motor 129, and the rotation is controlled by a result of phase comparison by a drum servo circuit 131 between the output of a tach pulse generator 130 indicating the rotation phase and the foregoing synchronizing signal (only vertical). By switching and driving the switch 126, therefore, by the output of the tach pulse generator 130 which is shaped by a switch pulse generator 128, the output of the foregoing adder 125A can be recorded on the main track of the magnetic tape 136 and the output of the foregoing adder 125B on the extended overlap recording track. The magnetic tape 136 travels as a capstan motor 132 rotates. The travel is controlled by a capstan servo circuit 134 on the basis of the output pulse of a frequency generator 133 which indicates the rotation phase of the capstan motor 132, resulting in a constant rate of travel specified by the VTR standard.

In the above example, the coding method for overlap recording signals is as specified by the current audio 8-bit PCM standard. However, it is not a necessary condition. There are possibilities that the number of bits increases in the future, and the coding method may conform to such an increased number of bits. In either way, it is convenient if the data addition circuit 120 and subsequent circuits can be shared. By doing this, a system wherein the section comprising the memory 108 and the switch 109 and the section comprising the A-D converter 117 shown in FIG. 2 are separated from the main unit, and the switches 118 and 119 are eliminated, and one of the separated sections mentioned above is mounted according to an application can be realized. This can contribute to miniaturization of the main unit.

Figure 3:
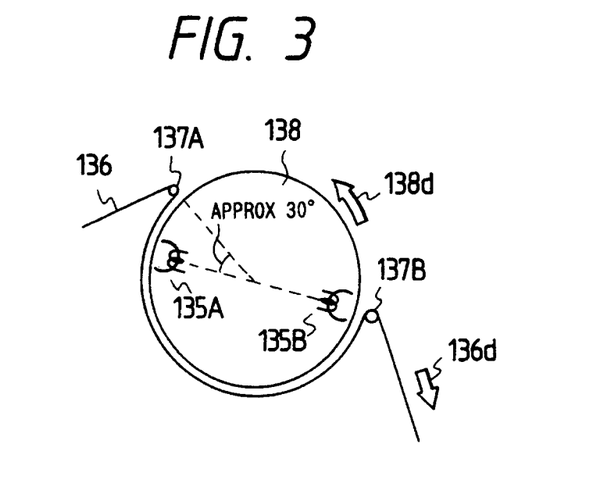
FIG. 3 is a plan view showing a rotary drum, magnetic heads mounted thereon, guide rollers, and a magnetic tape of the recording system of the magnetic recording and reproducing apparatus shown in FIG. 2.
Figure 4:
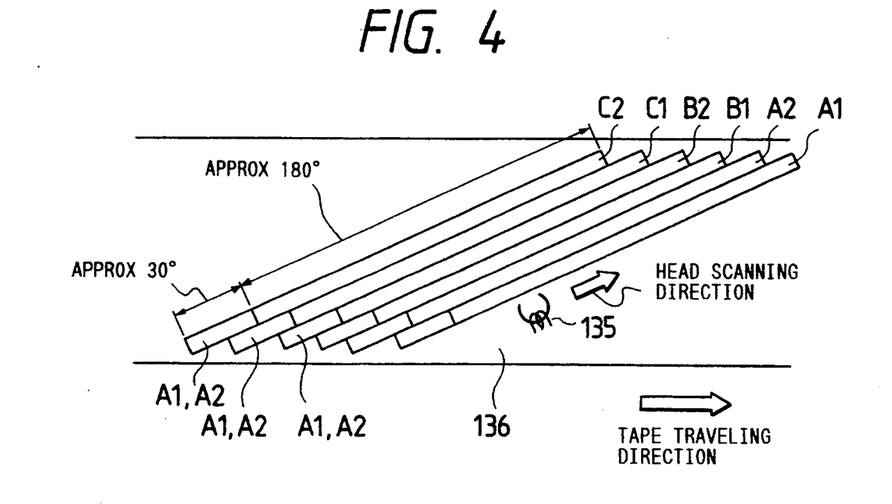
FIG. 4 shows a recording pattern, that is, recording tracks on a magnetic tape which are formed by the magnetic heads shown in FIG. 3.

FIG. 3 is a plan view showing a rotary head drum 138. In the figure, an arrow 138d indicates the rotation direction of the rotary head drum 138, and an arrow 136d the traveling direction of the magnetic tape 136. As mentioned above, the recording head 135 comprises two recording heads 135A and 135B, which are mounted opposite to each other. The magnetic tape 136 is positioned by guide rollers 137A and 137B so that it is wound round the rotary head drum 138 in a 210° arc (actually 220° to 230° including a margin). Therefore, the recording pattern on the magnetic tape is as shown in FIG. 4. Continuous moving pictures (and an FM audio signal and a pilot signal) are recorded during the winding period of about 180° and one-cut digital still pictures (and a pilot signal) are recorded on the overlap recording area of the residual about 30°. During the above period of 180°, moving pictures are recorded in a field per track in the order of $A_1$, $A_2$, $B_1$, $B_2$, ... shown in the figure. If a one-frame still picture is recorded during the overlap period, it requires a large number of tracks. The current 8-bit PCM standard specifies a data amount of 8400 bits/track. Since a frame is 3.8 Mb (in the case of composite quantization) long for 4 $f_{sc}$ and 8-bit quantization, about 450 tracks, that is, a time of about 7.5 seconds is required. Therefore, if the contents in the $A_1$ and $A_2$ fields are recorded as a frame, data is continuously recorded on many tracks as shown in the figure. If one-frame data is stored in the frame memory 108 shown in FIG. 2 and then data starts to be recorded immediately, it is recorded, as shown in the figure, starting at the extension of the $B_2$ field.

Next, the reproducing operation which is the main point of the present invention will be described hereunder. The configuration and operation of the apparatus depend on how to output moving and still pictures during reproduction.

Figure 5:
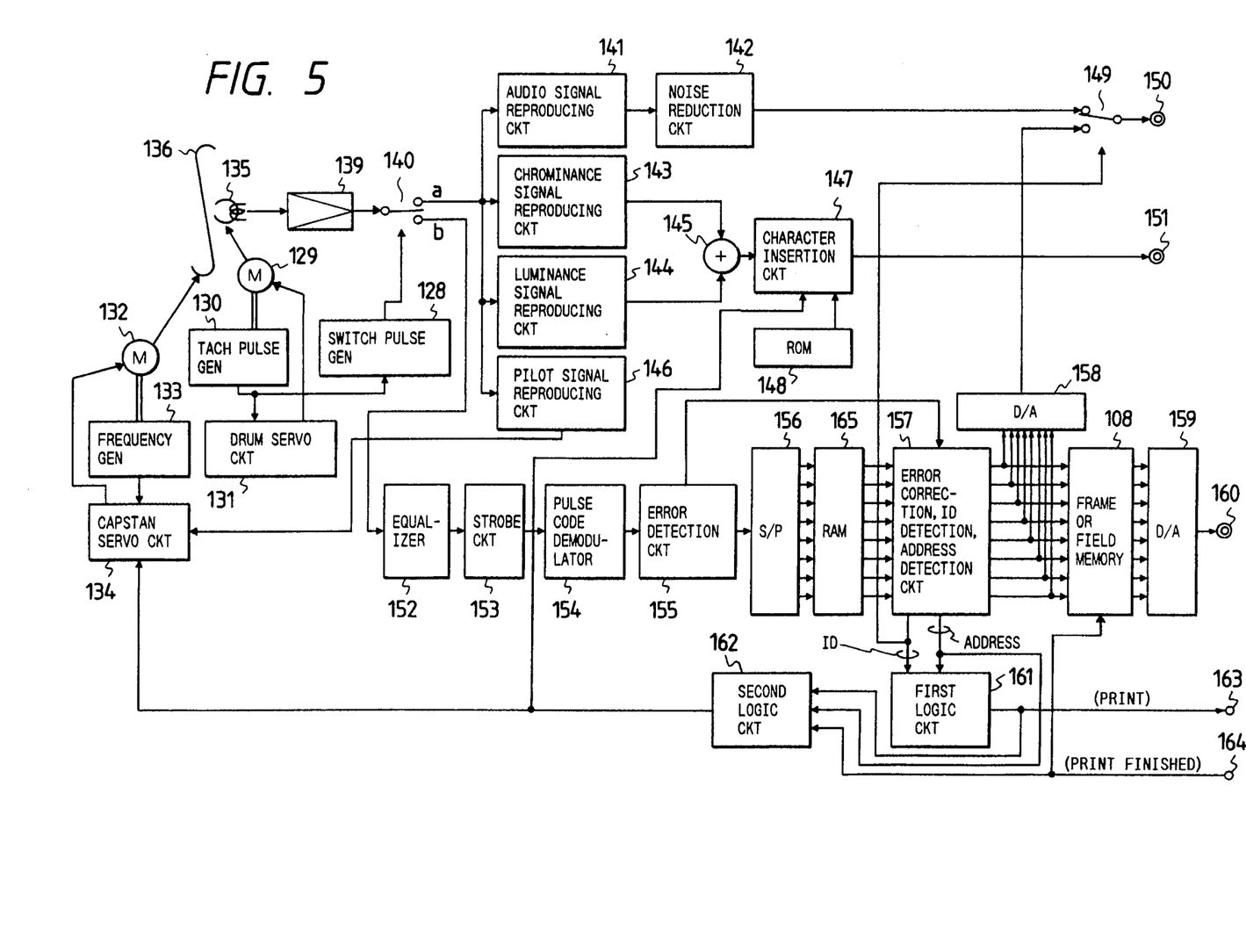
FIG. 5 is a block diagram showing a reproducing system of a magnetic recording and reproducing apparatus of another embodiment of the present invention.

In the first example, moving pictures and still pictures have separate output terminals. A use style such that when the user is watching moving pictures on a television set, still pictures are outputted to a printer connected to the output terminal for still pictures can be considered. FIG. 5 is a circuit block diagram showing an embodiment of the present invention in such a case. The components which are the same as those used for recording in FIG. 2 are assigned the same numbers.

A signal which is reproduced from the magnetic tape 136 by the reproducing head 135 (the recording head 135 shown in FIG. 2 may be used) is amplified by a reproducing amplifier 139 and supplied to a switch 140. The rotary head drum (not shown in the figure) where the reproducing head 135 is mounted is rotated by the drum motor 129. The output of the tach pulse generator 130 indicating the rotation phase is supplied to the drum servo circuit 131, which allows the drum motor 129 to rotate at a constant speed (30 rps). The switch 140 is switched and driven by the output of the tach pulse generator 130 which is shaped by the switch pulse generator 128, and continuous moving pictures (and an FM audio signal and a pilot signal) during the foregoing winding period of about 180° are obtained at the terminal on the "a" side in the figure, and signals (a PCM audio signal or one-cut digital still pictures and a pilot signal) in the overlap recording area of the residual about 30° at the terminal on the "b" side. The signal at the "a" terminal is supplied to an audio signal reproducing (demodulation) circuit 141, a chrominance signal reproducing circuit 143, a luminance signal reproducing circuit 144, and a pilot signal reproducing circuit 146.

In the pilot signal reproducing circuit 146, a tracking error signal is returned to the capstan servo circuit 134 on the basis of the beat component of the pilot signal for the current and neighboring tracks so that the reproducing head 135 traces the tracks in the same way as recording.

In the audio signal reproducing circuit 141, an FM audio signal with a carrier frequency of about 1.5 MHz is extracted to be frequency-demodulated, provided with a non-linear high-frequency band attenuation characteristic by a noise reduction circuit 142 (reverse characteristics to 113 shown in FIG. 2) so as to improve the signal-to-noise ratio, returned to the initial audio signal, and supplied to one end of a switch 149.

In the chrominance signal reproducing circuit 143, a chrominance signal with a subcarrier of about 47.25 $f_H$ is returned to the initial band (455/2 $f_H$) with the phase variation component eliminated, and supplied to one end of an adder 145.

In the luminance signal reproducing circuit 144, an FM luminance signal is demodulated to the initial signal, and supplied to another end of the adder 145.

The luminance and chrominance signals which are added by the adder 145 are outputted to an output terminal 151 via a character insertion circuit 147 whose operation will be described later so as to display moving pictures on an external television set. The luminance and chrominance signals are also supplied to the input terminal 111 shown in FIG. 2, and moving pictures can be monitored by the viewfinder 112.

The signal at the "b" terminal of the switch 140 is corrected in the frequency characteristics provided by the tape head system by a reproducing equalizer 152, and returned to a digital signal with the base band by a pulse code demodulator 154 after reproducing data is resampled by a data strobe circuit 153. Then, a data error caused by drop-out of the tape system is detected by an error detection circuit 155 on the basis of the CRC code assigned for recording, and the digital signal is returned to parallel (for example, 8 bits) data by a serial-to-parallel converter 156 and written into a buffer memory 165. The data is read by a clock signal with a frequency of, for example, $2f_H$, and the data error is corrected by an error correction circuit 157 on the basis of an instruction from the error detection circuit 155.

Whether the reproduced signal is an audio signal or a still picture is discriminated by the identification code assigned for recording, and information on the frame (or field) start and end points when the reproduced signal is a still picture is obtained from the address.

The output of the error correction circuit 157 is supplied to a D-A converter 158 and the frame (or field) memory 108. The D-A converter 158 is used to return an audio signal which is PCM-recorded to an analog signal, and the output thereof is supplied to another end of the switch 149. The switch 149 is driven according to the foregoing discrimination result by the identification code. When the identification code indicates that the reproduced signal is an audio signal, the audio signal which is PCM-recorded is outputted to an output terminal 150 in a priority basis. (Because the tone quality is better than that for FM recording.) When the identification code indicates that the reproduced signal is a still picture, an audio signal which is FM-recorded is outputted.

One-cut still picture data is stored in the memory 108, converted to an analog signal by a D-A converter 159, outputted to an output terminal 160, and then supplied to an external printer. The memory 108 may be interfaced with the printer in the digital mode unless the D-A converter 159 is used.

An output terminal 163 is an output terminal of a printing instruction signal to the printer. When still picture information which is discontinuously recorded at an optional location on the magnetic tape in units of one cut is stored in the memory 108 by one cut, a printing instruction is generated and outputted by a first logic circuit 161 on the basis of the foregoing address (and the identification code). It is needless to say that before one cut is stored, printing may start when some scanning lines are stored. The printer requires several minutes for printing one color image. If the next still picture information appears before the printing is finished and the memory 108 is rewritten, the normal printing is impossible. For that reason, a printing end signal from the printer is inputted via an input terminal 164 and supplied to the memory 108 and a second logic circuit 162. Before the printing end signal is supplied, data is inhibited to be written into the memory 108. In this case, some cuts of still pictures may not be printed. Therefore, if the next still picture data appears when the printing is not finished though a printing instruction is issued, the second logic circuit 162 sends an instruction to the capstan servo circuit 134 and the character insertion circuit 147. The capstan servo circuit 134 rewinds the magnetic tape 136 to near the start point of the next still picture data on the basis of this instruction, and keeps the magnetic tape stopped until the current printing is finished. The character insertion circuit 147 character-multiplexes the information stored in a ROM 148 onto moving pictures on the basis of this instruction, and notifies the user that the tape is kept stopped until the printing is finished, keeping him away from a strange impression. The above operation is performed when the memory 108 serves as a printer memory. When the printer has a memory, it is desirable to perform the same operation when still picture data after additional one cut is reproduced before a printing end signal instruction is issued.

In the embodiment shown in FIG. 5, the user can obtain all the required still pictures printed.

A monitor television set may be connected to the output terminal 160, or a still picture may be superimposed onto a signal supplied to the output terminal 151 (picture in picture) or switched by using a switch which is installed so as to be operated by the user.

In the second example, moving and still pictures are obtained from an output terminal, and can be monitored on the screen of a television set. It is possible that while moving pictures are being displayed, still pictures are displayed only when still picture data is found, the magnetic tape is rewound to near the still picture start position during that period and stopped there, and the magnetic tape starts traveling when an instruction is issued by the user so as to display moving pictures once again, or moving pictures are always displayed continuously and a part thereof is cut off so as to display still pictures one by one (so called picture in picture), or a part of still pictures is cut off inversely so as to display moving pictures. An embodiment of the first case will be described with reference to the circuit block diagram shown in FIG. 1. Many components are the same as those shown in FIG. 5, except that an one-shot type switch 1, a switch 2 and a third logic circuit 3 are installed.

Figure 1:
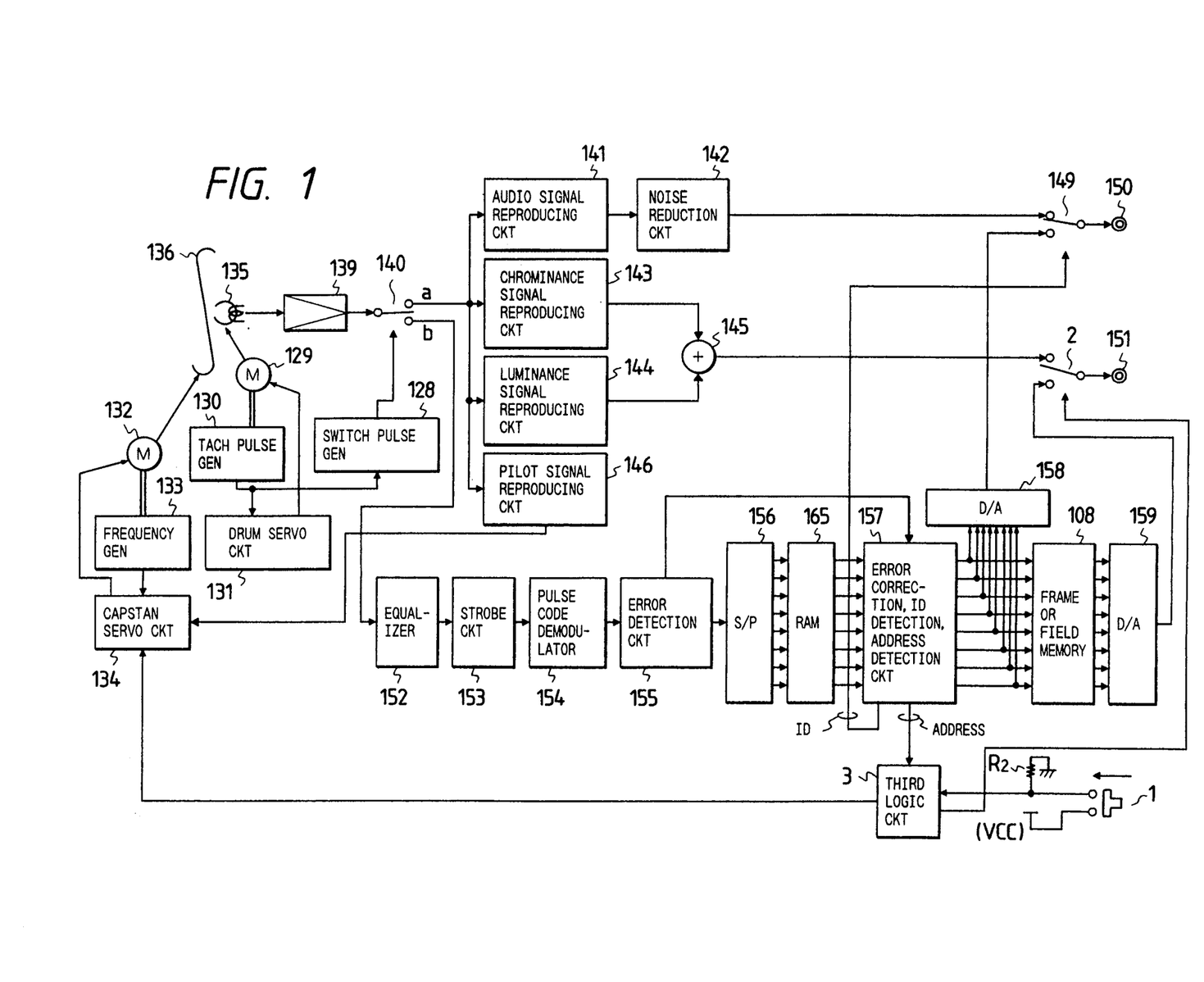
FIG. 1 is a block diagram showing a reproducing system of a magnetic recording and reproducing apparatus of an embodiment of the present invention.

The switch 2 is generally connected in the direction shown in the figure and sends moving pictures to the output terminal 151 to a television set. When one-frame (or field) still picture information is stored in the memory 108, the switch 2 is connected in the opposite direction by an instruction from the third logic circuit 3 and sends still pictures recorded in the overlap area. Simultaneously, the capstan servo circuit 134 rewinds the magnetic tape 136 to near the still picture data start position and keeps the tape stopped there also by an instruction from the third logic circuit 3. When the user presses the switch 1 next, the switch 2 is connected in the direction shown in the figure once again also by an instruction from the third logic circuit 3, and the capstan servo circuit 134 restarts tape traveling so as to reproduce moving pictures once again as usual.

It is possible that a fixed time after still pictures are displayed, the tape traveling restarts automatically so as to reproduce moving pictures once again. It is also possible that before reproduced data of still picture are stored by one cut in the memory 108, the reproduced data are outputted so as gradually to display a still picture of one cut in the same way as the first embodiment.

When the configuration shown in FIG. 1 is used, moving and still pictures can be monitored by a television set. Though one-cut still picture requires a recording and reproducing time of about 10 seconds as mentioned above, the foregoing rewinding and stopping operation for displaying still pictures eliminates a time skip for returning to moving pictures from still pictures.

In the embodiment shown in FIG. 1, an output terminal for the printer is not installed particularly unlike the embodiment shown in FIG. 5. Of course, such an output terminal may be installed as shown in the circuit block diagram in FIG. 6.

Figure 6:
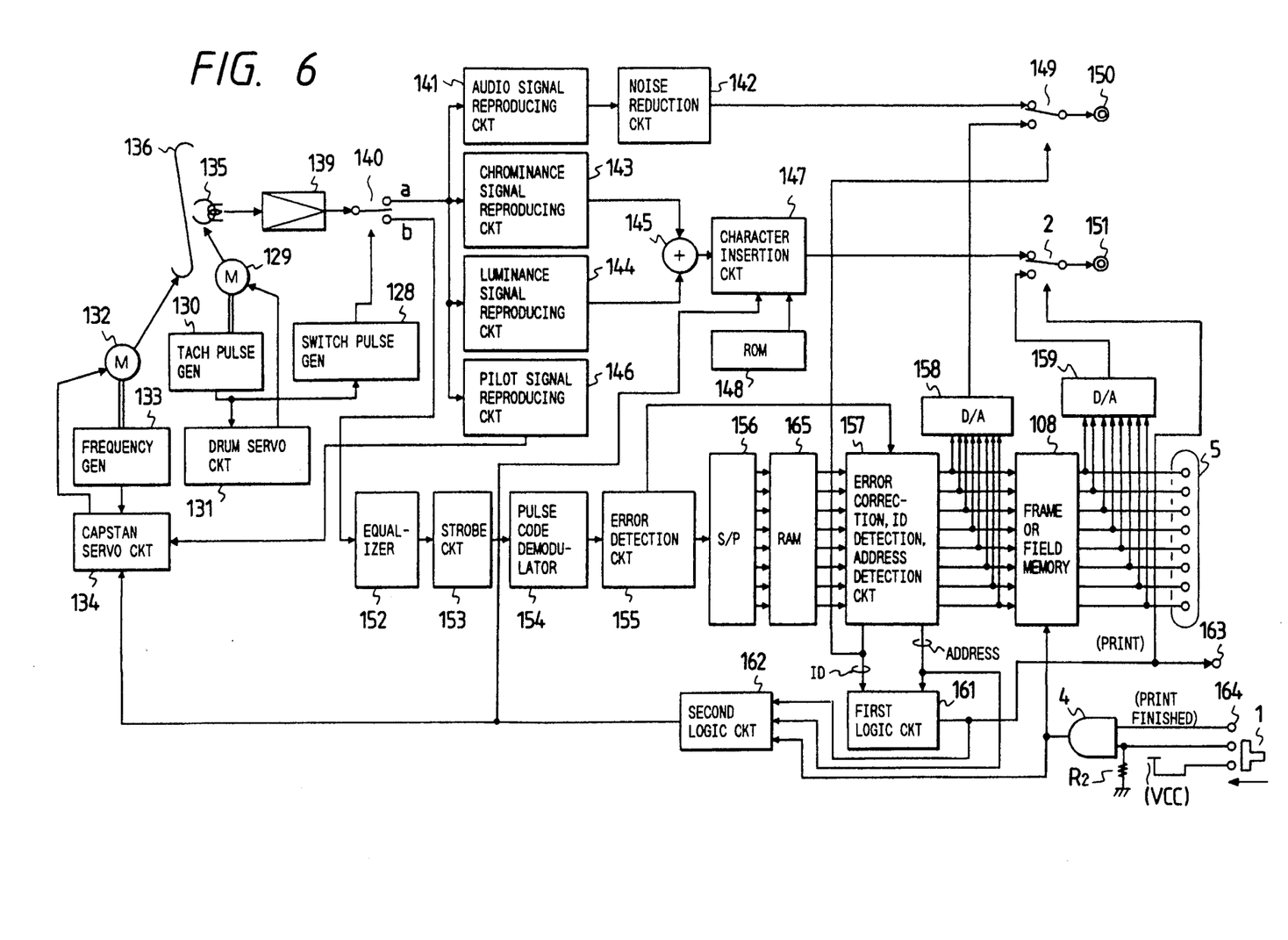
FIG. 6 is a block diagram showing a reproducing system of a magnetic recording and reproducing apparatus of another embodiment of the present invention.

The first one of differences between FIG. 6 and FIG. 5 is that an output terminal 5 of still pictures to the printer is a digital interface, whereby analog and digital signals are not converted repeatedly so as to prevent the picture quality from degradation. The second difference is that the switch 2 is installed in the same way as FIG. 1 so as to switch and output moving pictures or still pictures to a monitor television set. The third difference is that an AND circuit 4 is installed, and the general reproduction of moving pictures restarts after the printing of still pictures is finished and the user instructs returning to the reproduction of moving pictures.

Of course, it is possible that after a fixed time elapses, the reproduction of moving pictures restarts automatically.

When the above configuration is used, a time skip for returning from still pictures to moving pictures is eliminated in the same way as in FIG. 1, and the printing operation is not affected.

In the third embodiment, the user selects moving pictures or still pictures. The embodiment will be described with reference to the circuit block diagram shown in FIG. 7.

Figure 7:
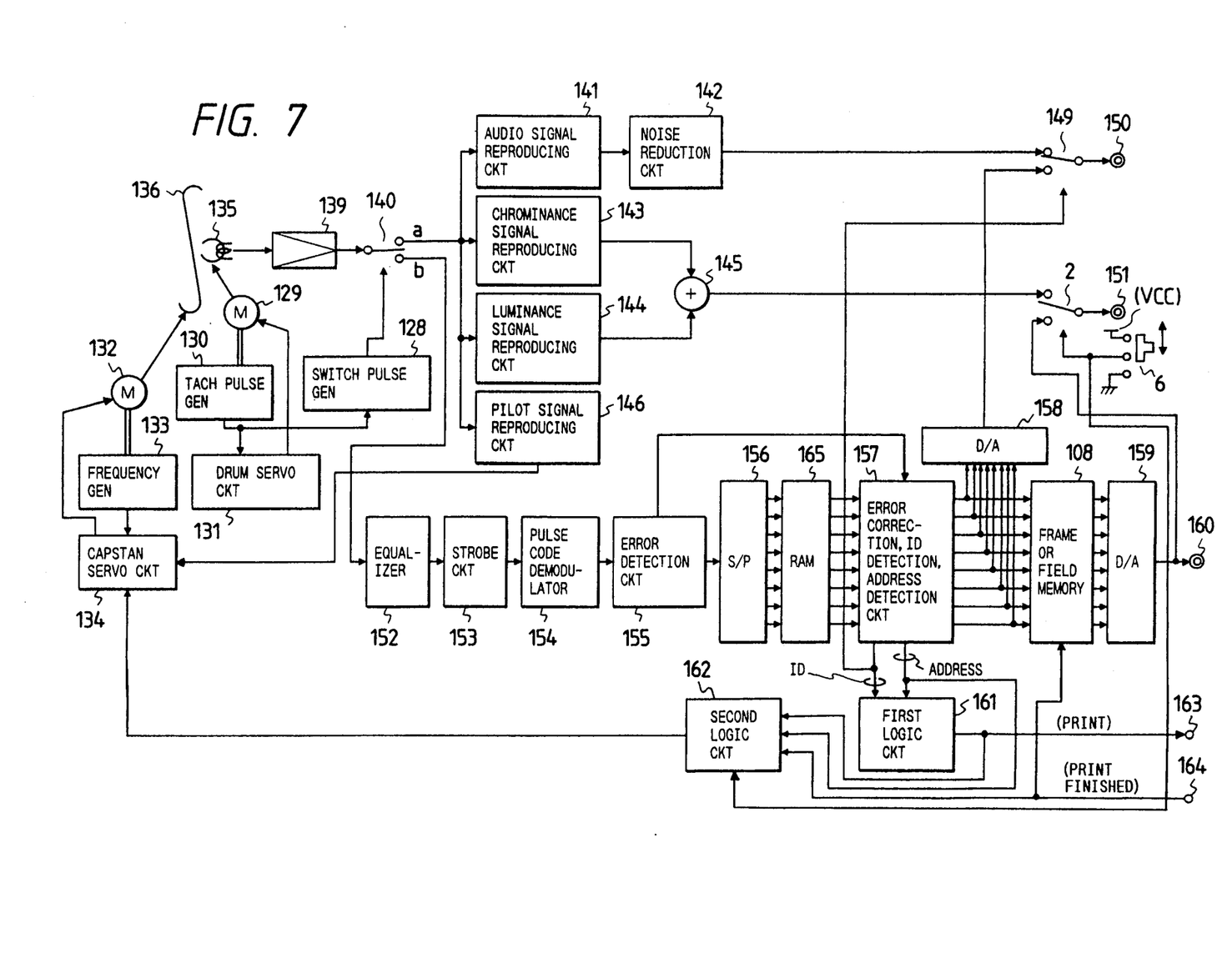
FIG. 7 is a block diagram showing a reproducing system of a magnetic recording and reproducing apparatus of a further embodiment of the present invention.

The difference between FIG. 7 and FIG. 5 is that a bistable switch 6 which is operated by the user is installed. By using the bistable switch 6, whether to output moving pictures or still pictures to the output terminal 151 to a monitor television set is selected by the switch 2. The output of the switch 6 is also connected to the second logic circuit 162 so as to switch the operation of the capstan servo circuit 134.

When the user operates the switch 6 so as to reproduce moving pictures, the general reproducing operation is performed. When the user selects reproduction of still pictures, the capstan servo circuit 134 enters the search mode, and allows the magnetic tape 136 to travel at a high speed so as to, search for the location where the first still picture data is recorded. The capstan servo circuit 134 detects the location from the reproduction address, rewinds the tape a little immediately, and performs the general reproducing operation starting at the beginning of the recorded still picture data. When one-cut data is read, the capstan servo circuit 134 enters the search mode once again and searches for the location where the next still picture data is stored. When the capstan servo circuit 134 detects the location, it rewinds the tape a little immediately. When a printing end instruction is not inputted from the input terminal 164 at this time, the capstan servo circuit 134 keeps the tape stopped at the location until the printing end instruction is issued. When the printer has a memory in the same way as in the foregoing embodiment, the capstan servo circuit 134 performs the same operation when the tape reaches the location where the still picture data after additional one cut is recorded. Then, the capstan servo circuit 134 performs the general reproducing operation and reads one-cut data.

The embodiment shown in FIG. 7 is suited to still pictures which are required to be printed quickly. It is possible that units equivalent to the switch 1 and the AND circuit 4 shown in FIG. 6 are installed and the time required for starting the next one cut after the printing is finished is optionally set. As to output of still pictures to be sent to the monitor television set from the output terminal 151, previous images may be outputted continuously during the searching operation, and a previous image may be gradually rewritten by the next still picture during the general reproducing operation.

In the embodiments shown in FIGS. 5, 6, and 7, the operation with the external printer connected is described. It is needless to say that such an external printer may not be used. When no printer is connected, it is desirable that a logic signal indicating the end of printing always indicates "end".

The same may be said with a case where the input and output terminals 160, 163, and 164 between the apparatus and the printer are not installed. In the above description, the printing operation is automatically performed. However, only data to be printed may be selected.

The present invention improves the reproducing operations of an apparatus wherein one-cut still pictures are recorded at an optional location of the overlap recording area of a 8 mm video VTR.

According to the present invention, whether to watch moving pictures or still pictures (or to print still pictures) can be selected, and in the latter case, the location where still pictures are recorded is searched for at a high speed, and the searching operation is restarted after printing. Therefore, the printing output may be obtained quickly and correctly.

According to the present invention, when still pictures are to be displayed in place of moving pictures only when still picture data is found, the time that still pictures are displayed can be optionally selected, and no strange feeling (frame skipping) is provided when moving pictures are restarted.

According to the present invention, when a printer still picture output is provided besides the moving picture output, no strange feeling is caused by natural stop during printing and an efficient printing output is obtained.

What is claimed is:

1. A magnetic recording and reproducing apparatus comprising:
   a rotary drum;
   a magnetic head mounted to said rotary drum;
   a mechanism for traveling a magnetic tape so that it winds round the rotary drum at an angle of more than 180°;
   means for recording a moving picture signal and an audio signal following the moving picture on a first area in a recording track inclined to a traveling direction of the magnetic tape;
   means for recording digital data indicating a one-cut still picture signal corresponding to a frame or a field on a second area in said recording track;
   means for reproducing said moving picture signal;
   means for reproducing said audio signal following said moving picture;
   means for reproducing said still picture signal;
   means for detecting that digital data indicating the still picture is reproduced by an amount of data corresponding to the one-cut still picture;
   a switch which is operated by a person who monitors pictures so as to instruct restart of the magnetic tape; and
   a logic circuit;
   wherein, in a reproducing mode, said logic circuit generates an instruction for switching the reproduced signal output from moving pictures to still pictures on the basis of the output of said means for detecting and an instruction for rewinding the magnetic tape to near the recording start position of the digital data indicating the still picture and stopping the magnetic tape there, and generates an instruction for switching the reproduced signal output from still pictures to moving pictures when said switch is operated and an instruction for restarting the magnetic tape so as to travel at the general traveling speed for reproducing the moving picture signal.

2. An apparatus according to claim 1 wherein said apparatus further comprises means for recording digital data indicating an audio signal on said second area in said recording track in a recording format which is the same as that of said digital data indicating a still picture, and a switch for outputting said audio signal which is recorded on and reproduced from said second area in said recording track priority over said audio signal which is recorded on and reproduced from said first area in said recording track.

3. An apparatus according to claim 2 wherein a memory for storing the one-cut still picture digital data which is to be recorded on said second area in said recording track and an A-D converter for converting an audio signal to digital data which is to be recorded on said second area in said recording track can be mounted selectively.

4. A magnetic recording and reproducing apparatus comprising:
a rotary drum
a magnetic head mounted to said rotary drum;
a mechanism for traveling a magnetic tape so that it winds round the rotary drum at an angle of more than 180°;
means for recording a moving picture signal and an audio signal following the moving picture on a first area in a recording track inclined to a traveling direction of the magnetic tape;
means for recording digital data indicating a one-cut still picture signal corresponding to a frame or a field on a second area in said recording track;
means for reproducing said moving picture signal;
means for reproducing said audio signal following said moving picture;
means for reproducing said still picture signal;
a terminal for supplying the reproduced still picture signal to an external printer which prints the still picture;
means for inserting character information into the reproduced moving picture signal;
means for detecting that digital data indicating the still picture is reproduced by an amount of data corresponding to the one-cut still picture;
a terminal for sending the detection result to said external printer;
a terminal for receiving information indicating that the printing of one-cut still picture is finished from said external printer; and
a logic circuit;
wherein said logic circuit generates an instruction for rewinding the magnetic tape to near the recording start position for the digital data of the subsequent one-cut still picture and keeping the magnetic tape stopped there when the detection result indicating that said digital data of the subsequent one-cut still picture is reproduced is provided before information indicating that the printing of the previous one-cut still picture is finished is sent from said external printer, and an instruction for instructing said character information insertion means to output, as a moving picture signal, character information indicating that the magnetic tape is stopped because the still picture is being printed, while generates an instruction for traveling the magnetic tape once again at the general speed for reproducing a moving picture signal when information indicating that the printing of said previous one-cut still picture is finished is sent from said external printer, and an instruction for instructing said character information insertion means to stop outputting said character information as the moving picture signal.

5. An apparatus according to claim 4 wherein said apparatus further comprises means for recording digital data indicating an audio signal on said second area in said recording track in a recording format which is the same as that of said digital data indicating a still picture, and a switch for outputting said audio signal which is recorded on and reproduced from said second area in said recording track in priority over said audio signal which is recorded on and reproduced from said first area in said recording track.

6. An apparatus according to claim 5 wherein a memory for storing said one-cut still picture digital data which is to be recorded on said second area in said recording track and an A-D converter for converting an audio signal to digital data which is to be recorded on said second area in said recording track can be mounted selectively.

7. A magnetic recording and reproducing apparatus comprising:
a rotary drum;
a magnetic head mounted to said rotary drum;
a mechanism for traveling a magnetic tape so that it winds round the rotary drum at an angle of more than 180°;
means for recording a moving picture signal and an audio signal following the moving picture on a first area in a recording track inclined to a traveling direction of the magnetic tape;
means for recording digital data indicating a one-cut still picture signal corresponding to a frame or a field on a second area in said recording track;
means for reproducing said moving picture signal;
means for reproducing said audio signal following said moving picture;
means for reproducing said still picture signal; a switch which is operated by a person who monitors pictures so as to select which is to be monitored, said moving picture or said still picture;
a terminal for supplying the reproduced still picture signal to an external printer which prints the still picture;
means for detecting that digital data indicating the still picture is reproduced by an amount of data representing the one-cut still picture;
a terminal for sending the detection result to said external printer;
a terminal for receiving information indicating that the printing of one-cut still picture is finished from said external printer; and
a logic circuit;
wherein said logic circuit, in case that said switch is set to the "moving picture" position, generates an instruction for traveling the magnetic tape at the general speed for reproducing a moving picture signal, while, in case that said switch is set to the "still picture" position, generates an instruction for feeding the magnetic tape quickly to the location where the first still picture digital data is recorded, rewinding the magnetic tape after the location of the first data is detected, and reproducing the first still picture digital data at said general speed starting at near the recording start point for the first still picture digital data, an instruction for feeding the magnetic tape quickly to the location where the next still picture digital data is recorded after the fact that the first still picture digital data is reproduced by an amount of data corresponding to the one cut is detected, rewinding the magnetic tape after the location of the next data is detected, rewinding the magnetic tape to near the recording start point for the next still picture digital data, and reproducing the next still picture digital data at said general speed when the printing of the first still picture is finished, and an instruction for keeping the magnetic tape stopped until the printing of the first still picture is finished when the printing of the first still picture is not finished.

8. An apparatus according to claim 7 wherein said apparatus further comprises means for recording digital data indicating an audio signal on said second area in said recording track in a recording format which is the same as that of said digital data indicating a still picture, and a switch for outputting said audio signal which is recorded on and reproduced from said second area in said recording track in priority over said audio signal which is recorded on and reproduced from said first area in said recording track.

9. An apparatus according to claim 8 wherein a memory (108) for storing said one-cut still picture digital data which is to be recorded on said second area in said recording track and an A-D converter for converting an audio signal to digital data which is to be recorded on said second area in said recording track can be selectively mounted.

10. An magnetic and recording apparatus further comprising:
   a rotary drum;
   a magnetic head mounted to said rotary drum;
   a mechanism for traveling a magnetic tape so that it winds round the rotary drum at an angle of more than 180°;
   means for recording a moving picture signal and an audio signal following the moving picture on a first area in a recording track inclined to a traveling direction of the magnetic tape;
   means for recording digital data indicating a one-cut still picture signal corresponding to a frame or a field on a second area in said recording track;
   means for reproducing said moving picture signal;
   means for reproducing said audio signal following said moving picture;
   means for reproducing said still picture signal;
   means for detecting that digital data indicating the still picture is reproduced by an amount of data corresponding to the one-cut still picture;
   a switch which is operated by a person who monitors pictures so as to instruct restart of the magnetic tape;
   a logic circuit, wherein said logic circuit generates an instruction for switching the reproduced signal output from moving pictures to still pictures on the basis of the said means for detecting and an instruction for rewinding the magnetic tape to near the recording start position of the digital data indicating the still picture and stopping the magnetic tape there, and generates an instruction for switching the reproduced signal output from still pictures to moving pictures when said switch is operated and an instruction for restarting the magnetic tape so as to travel at the general traveling speed for reproducing the moving picture signal;
   a terminal for supplying the reproduced still picture signal to an external printer which prints the still picture;
   means for inserting character information into the reproduced moving picture signal;
   a terminal for sending the detection result of said detection to said external printer;
   a terminal for receiving information indicating that the printing of the one-cut still picture is finished from said external printer; and
   an additional logic circuit, said additional logic circuit generating an instruction for rewinding the magnetic tape to near the recording start position for the digital data of the subsequent one-cut still picture and keeping the magnetic tape stopped there when the detection result indicating that said digital data of the subsequent one-cut still picture is reproduced is provided before information indicating that the printing of the previous one-cut still picture is finished is sent from said external printer, and an instruction for instructing said character information and insertion means to output, as a moving picture signal, character information indicating that the magnetic tape is stopped because the still picture is being printed, while generating an instruction for traveling the magnetic tape once again at the general speed for reproducing a moving picture signal when information indicating that the printing of said previous one-cut still picture is finished is sent from said external printer, and an instruction for instructing said character information and insertion means to stop outputting said character information as the moving picture signal.

* * * * *